Figure 1:
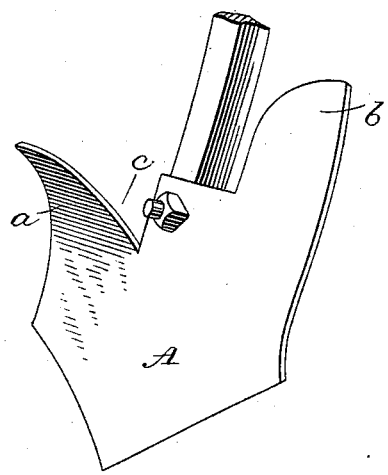

(No Model.)

J. T. BOND.
CULTIVATOR TOOTH.

No. 332,585. Patented Dec. 15, 1885.

Attest
Walter Donaldson
Isadore Middleton

Inventor
John T. Bond
by Joyce & Spear
Attys.

UNITED STATES PATENT OFFICE.

JOHN T. BOND, OF BOND'S MILL, GEORGIA.

CULTIVATOR-TOOTH.

SPECIFICATION forming part of Letters Patent No. 332,585, dated December 15, 1885.

Application filed September 10, 1885. Serial No. 176,721. (No model.)

*To all whom it may concern:*

Be it known that I, JOHN T. BOND, of Bond's Mill, in the county of Twiggs and State of Georgia, have invented a new and useful Improvement in Cultivator-Teeth; and I do hereby declare that the following is a full, clear, and exact description of the same.

My invention relates to cultivator-teeth; and its object is to provide a tooth which will turn the soil toward the growing plants in close working, instead of dragging the soil from them, as in ordinary cases.

Another object is to provide means for uprooting and covering the weeds upon the side opposite to the plants in the center between the rows, the action of the tooth being different upon one side from what it is upon the other.

The invention consists in forming the cultivator-tooth upon one side with a forwardly and laterally projecting curved wing similar to the mold-board of a plow, and in forming a projection or plate upon the opposite side extending up above the tooth proper and to one side, so as to leave a space between the cultivator-standard and said projection.

In the drawing, the figure represents the tooth detached.

In this drawing, A represents the tooth, and *a b* the improvements which are of my invention.

In the cultivating of growing plants of all kinds it is desirable that the ground be thrown up to the rows of plants, and at the same time that upon the opposite side of the cultivator-teeth the weeds and grass be thoroughly uprooted and covered up.

The improved tooth has a convex outer surface and a V-shaped lower portion similar to those ordinarily used. The left side, *a*, however, instead of being continued upward, as usual, on the same curve, is bent slightly forward with a lateral twist, the tooth being cut down, as shown at *c*, for this purpose. This curve causes the side *a* to turn the earth as it passes over the face of the blade and directs it against the roots of the growing plants, turning it completely over with the grass or weeds downward.

The tooth is secured to the standard of the cultivator in the ordinary manner by a bolt passing through both.

In order to fully uproot the grass and weeds between the rows, I extend the tooth upward on the side opposite the wing *a*, as shown at *b*. This extension is on the edge, and terminates in a curved upper part. A space is left between this extension and the cultivator-standard, so that the action is not impeded by clogging, the disintegrated soil passing through between. This extension, in connection with the ordinary action of the tooth, thoroughly stirs up the ground, and as the earth passes over and around the extension *b* it completely covers all the weeds and grass.

It will be obvious that while I have shown the wing *a* upon the left and the extension *b* upon the right, the parts may be reversed in order to work the cultivator differently.

Having thus described my invention, what I claim is—

A cultivator-tooth consisting of a body portion of ordinary shape, a wing, *a*, upon one side curved substantially as described, and an extension, *b*, upon the other side, all substantially as described.

In testimony whereof I have signed my name to this specification in the presence of two subscribing witnesses.

JOHN T. BOND.

Witnesses:
 JAMES H. BULL,
 JOHN B. BOND.